Dec. 19, 1922.
1,439,282
A. W. AMSDEN.
TWIST DRILL GAUGE.
FILED MAR. 2, 1922.
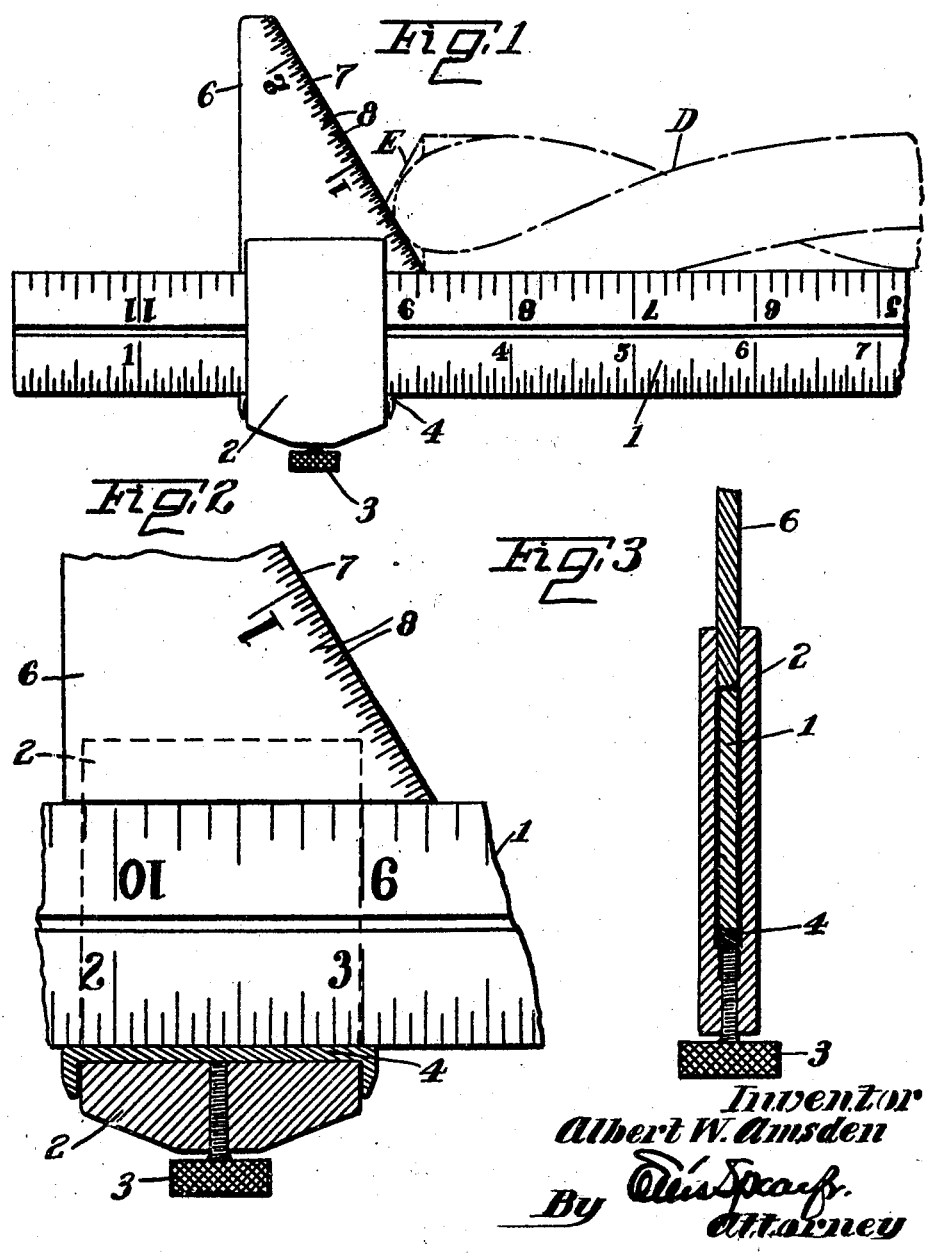
Inventor
Albert W. Amsden
By [signature]
Attorney Patented Dec. 19, 1922.

1,439,282

UNITED STATES PATENT OFFICE.

ALBERT WASHINGTON AMSDEN, OF ATHOL, MASSACHUSETTS, ASSIGNOR TO THE L. S. STARRETT COMPANY, OF ATHOL, MASSACHUSETTS, A CORPORATION OF MASSACHUSETTS.

TWIST-DRILL GAUGE.

Application filed March 2, 1922. Serial No. 540,595.

*To all whom it may concern:*

Be it known that I, ALBERT W. AMSDEN, a citizen of the United States, residing at Athol, county of Worcester, Commonwealth of Massachusetts, have invented certain new and useful Improvements in Twist-Drill Gauges, of which the following is a specification.

This invention relates to gauges, and particularly to a gauge for gauging drill points. In the manufacture of drills it is essential that the drill be properly ground at the point in order to insure maximum cutting efficiency and to avoid splitting. If the cutting edges are not uniformly ground, that is if both cutting edges are not of the same angle and length with relation to the drill axis, the drill will not cut to size. For the majority of operations an angle of 59° is generally accepted as correct.

To the end therefore of providing a simple and inexpensive tool for accurately gauging drill points, I have devised my present invention.

According to my invention, the drill to be gauged is laid against a blade with its axis parallel to the straight edge thereof and with its cutting edge disposed against a graduated gauge piece mounted on said straight edge at an angle of 59° thereto, this being the angle generally accepted as correct for the majority of work. The point on the graduated gauging edge at which the center of the drill comes is then noted, whereupon the drill is turned to present its other cutting edge to the gauge, and if the center of grinding comes on the gauging edge at the same point at which it came when the first cutting edge was gauged, the operative knows that the drill is accurately ground.

The construction and operation of my gauge is described and illustrated in the accompanying specification and drawings, and the characteristic features of novelty are particularly pointed out in the appended claims. Throughout the specification and drawings like reference characters are correspondingly applied, and in the drawings:

Fig. 1 is an elevation of a gauge in accordance with my invention and indicating the manner of use thereof in gauging a drill point.

Fig. 2 is an enlarged fragmentary detail, partly in section, and Fig. 3 is a vertical section through the parts shown in Fig. 2.

I have indicated at 1 a graduated blade such as is ordinarily used in the familiar square. Adjustable along said blade is a U-shaped head or a stirrup 2. The adjustment of said head is held by a set screw 3 which engages and carries a clamp 4 disposed across the closed bottom of the stirrup into engagement with the bottom edge of the blade 1.

Fixed edgewise, as by welding in the open end of the stirrup to rest flatly on the upper edge of the blade 1 is a gauge piece 6. The gauge piece 6 is generally of right triangle form and its hypotenuse 7 is disposed at an angle of 59°, preferably, to the blade 1. Either or both faces of the hypotenuse 7 are graduated, preferably in 32nds of an inch, as indicated at 8, to constitute a gauging edge.

In use, the blade 1 is ordinarily held in the left hand with the graduations 8 facing the user and the drill D to be gauged is held in the right hand with one of its spiral edges laid against the adjacent edge of the blade. The drill is thus positioned with its axis parallel to the blade 1 and with one of its cutting edges C disposed against the graduated gauging edge 7 of the gauge piece 6. The operative notes where the center of the drill comes with respect to the graduations 9 and then rotates the drill to present the other cutting edge to the gauging edge 6. If the center of the grinding comes upon the graduations at the same point as did the first-gauged cutting edge, the operative will know that the drill is accurately ground.

In addition to its use as a drill gauge, the slidable head 2 adapts the gauge for us as a hook rule or a depth gauge or even a square.

Various other modifications in the construction and use of my device may obviously be made without departing from the spirit of my invention if within the limits of the appended claims.

What I therefore claim and desire to secure by Letters Patent is:

1. A drill gauge comprising a blade against which a drill is adapted to be laid with its axis parallel thereto, a head provided with an open-ended slot and adjustable longitudinally along said blade, means for holding the adjustment of said head, a gauge piece mounted in the open end of said slot and secured to said head, said gauge piece seated against the adjacent edge of the blade to lie in the same plane therewith and having a graduated gauging edge disposed at an angle of approximately 59° to said blade and against which the cutting edges of the drill are adapted to be successively laid upon relative rotation of the drill and gauge piece to indicate the angular relation of said cutting edges to the drill axis.

2. A drill gauge comprising a blade against which a drill is adapted to be laid with its axis parallel thereto, a head provided with an open-ended slot and adjustable longitudinally along said blade, means for holding the adjustment of said head, a substantially right triangular gauge piece mounted in the open end of said slot and secured to said head, said gauge piece having its base seated against the adjacent edge of the blade to lie in the same plane therewith and with its hypotenuse graduated and disposed at an angle of approximately 59° to said blade and against which the cutting edges of the drill are adapted to be successively laid upon relative rotation of the drill and gauge piece to indicate the angular relation of said cutting edges to the drill axis.

3. A gauge comprising a blade, a U-shaped head straddling said blade and slidable therealong, a clamp interposed between the closed end of said head and the adjacent edge of the blade, and movable against said blade edge to hold the adjustment of said head, and a gauge piece mounted in the open end of said head and secured to said head, said gauge piece seated against the adjacent edge of the blade to lie in the same plane therewith and having a graduated gauging edge disposed at an angle to said blade.

In testimony whereof I affix my signature in presence of two witnesses.

ALBERT WASHINGTON AMSDEN.

Witnesses:
WILLIAM E. CROMER,
WALTER L. MAYHEW.